Figure 13:
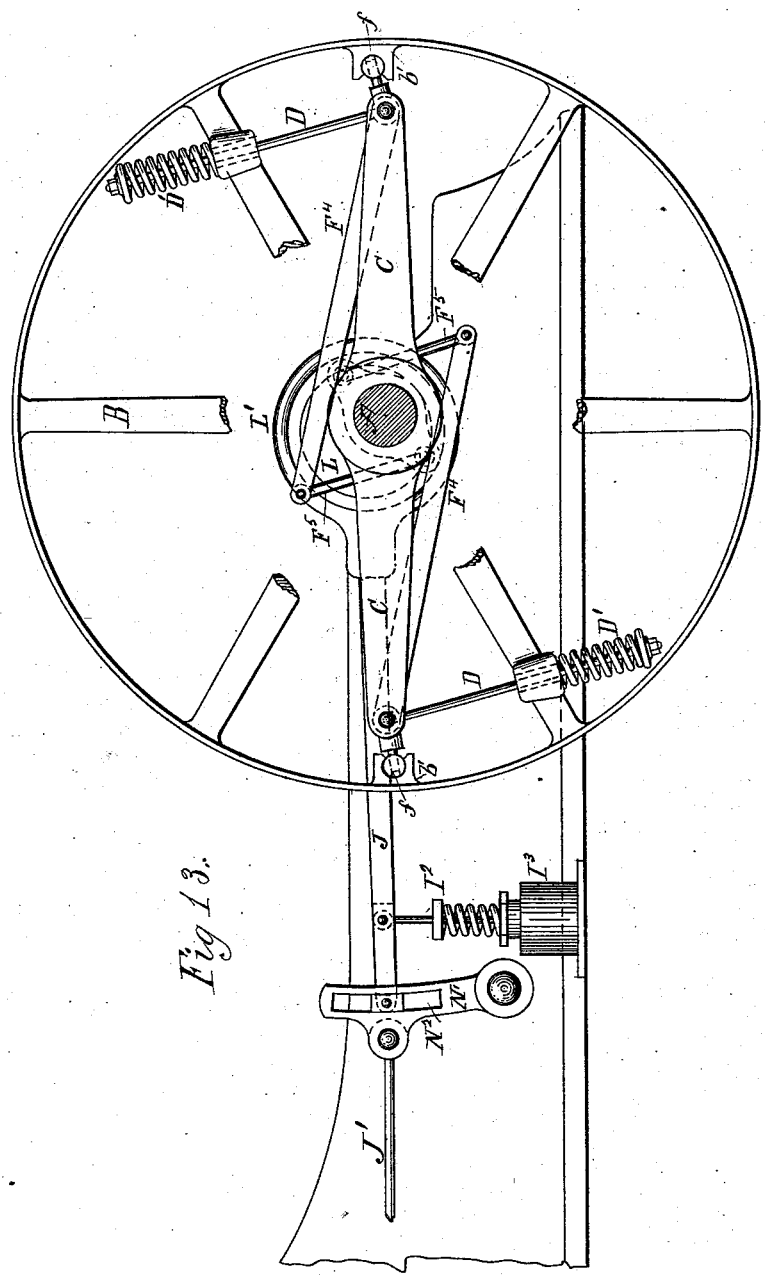

(No Model.) 4 Sheets—Sheet 1.
E. F. SPAULDING.
CUT-OFF VALVE GEAR.
No. 281,314. Patented July 17, 1883.
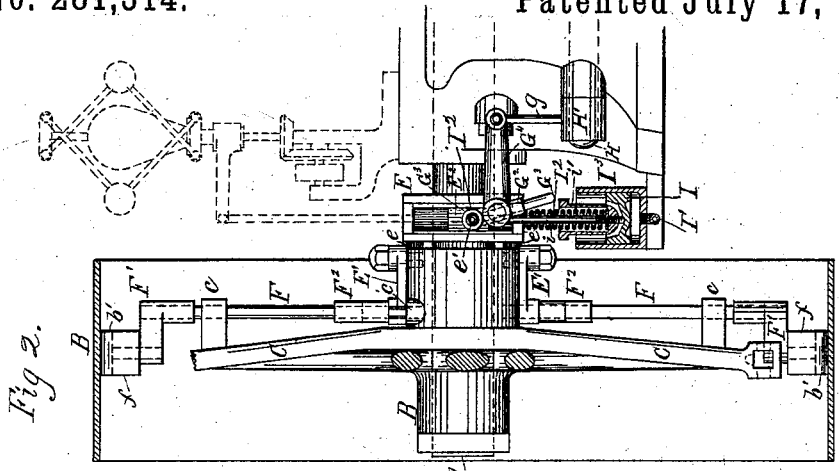
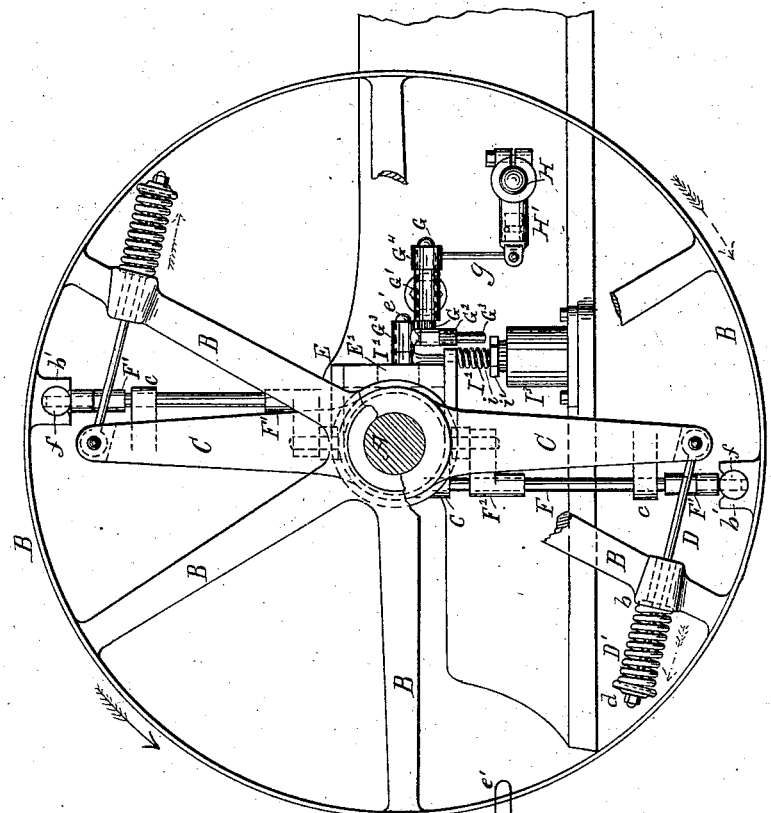
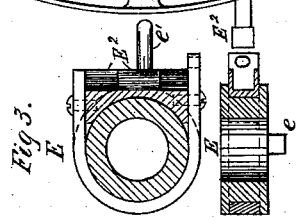
Witnesses:
W. R. Edelen
Robt. H. Porter.
Inventor.
E. F. Spaulding
per Hallock & Hallock
attys.

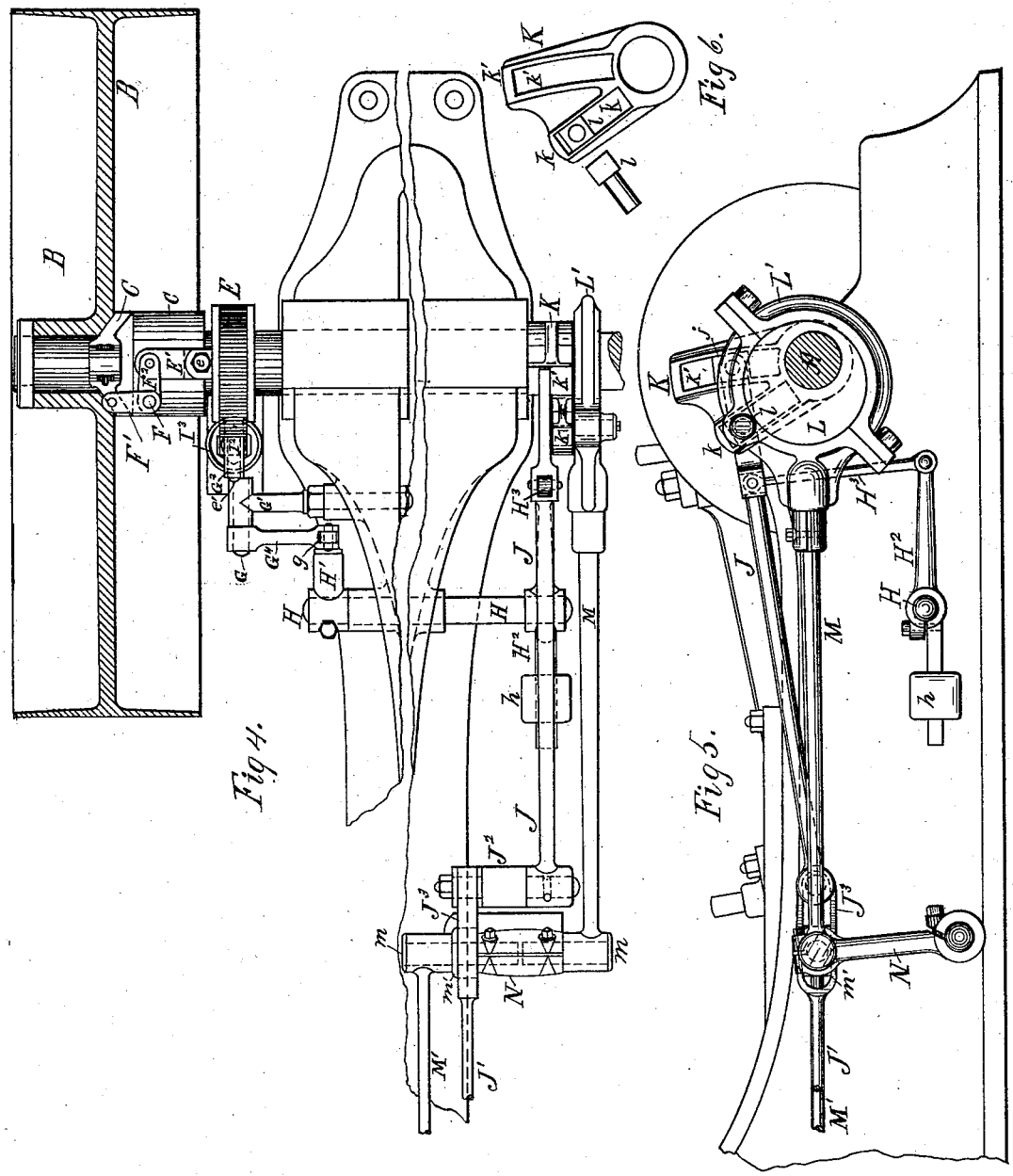

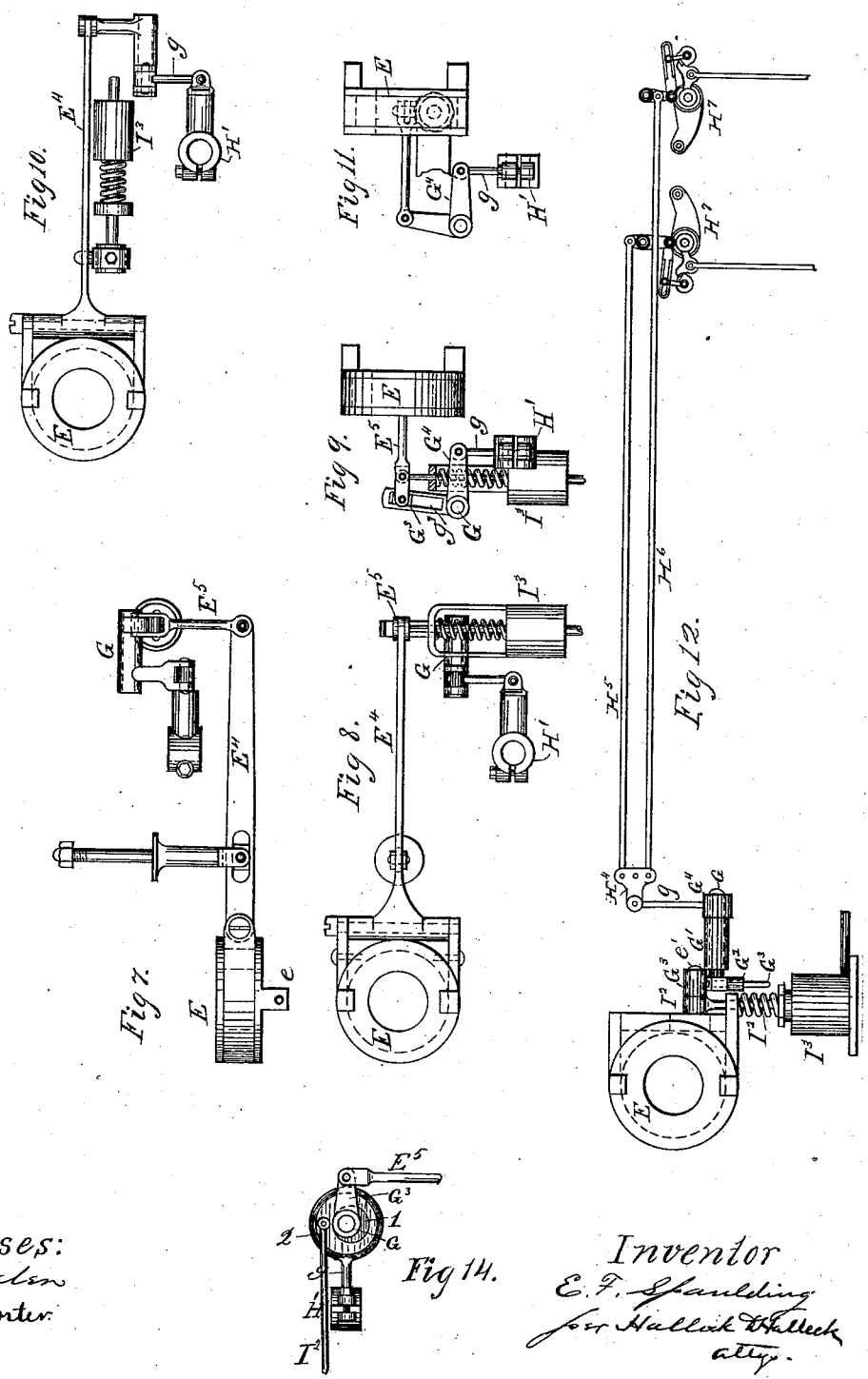

(No Model.) 4 Sheets—Sheet 4.

E. F. SPAULDING.
CUT-OFF VALVE GEAR.

No. 281,314. Patented July 17, 1883.

Witnesses:
W. R. Edelen.
Robt. H. Porter.

Inventor
E. F. Spaulding
per Hillock & Wallick
attys.

UNITED STATES PATENT OFFICE.

ELIJAH F. SPAULDING, OF ERIE, PA., ASSIGNOR OF TWO-THIRDS TO JOHN K. HALLOCK AND ELMER S. SMITH, OF SAME PLACE.

CUT-OFF-VALVE GEAR.

SPECIFICATION forming part of Letters Patent No. 281,314, dated July 17, 1883.

Application filed May 11, 1883. (No model.)

*To all whom it may concern:*

Be it known that I, ELIJAH F. SPAULDING, a citizen of the United States, residing at Erie, in the county of Erie and State of Pennsylvania, have invented certain new and useful Improvements in the Automatic Cut-Off-Valve Gear of Steam-Engines; and I do hereby declare the following to be a full, clear, and exact description of the invention, such as will enable others skilled in the art to which it appertains to make and use the same.

This invention consists in providing certain new and useful improvements in the variable cut-off mechanism of steam-engine valve-gears.

The first part of the invention consists in combining a dynamometrical and a steam-pressure regulator with a variable cut-off-valve gear in such a manner that the two regulators and the valve-moving mechanism shall together form an integral automatically-variable cut-off-valve gear. This is in contradistinction of the employment of both said regulators in an engine in such a manner that they are employed to change the position of the valve upon peculiarly-formed ports, while the valve-gear proper reciprocates the valve invariably; or where one of the regulators changes the position of the valve, as aforesaid, while the other varies its reciprocal movement, both of which applications have been proposed, neither of which, however, is such a combination of the two regulators in the valve-moving mechanism as forms such an integral automatically-variable cut-off-valve gear as is contemplated by this invention; for in each instance named there are two separate gears moving the valve in two separate directions. Whatever merit there may be in the said proposed appliances, it is evident that they cannot serve in connection with the various types of variable cut-off-valve gears.

It is the principal object of this invention to provide for the coactive operation of these two regulators in most or all of the various well-known types of valve-gear of automatic cut-off engines, which are or may be included under the following classes: link-movements, shifting eccentrics, and a large class which are generally called "Corliss." In few of these can the proposed construction above referred to be applied without modifying the construction of the valve, while by my construction, here shown, the construction or manner of action of the valve is in no way considered, the whole object being to qualify or vary the variable parts of the gear from the coaction of the two regulators, whatever the style of the gear or valve.

The second part of my invention relates to the construction and combination of parts forming the gearing, as will be hereinafter fully set forth.

I am aware that two forms or types of governor have been combined in an engine, one of which is a dynamometrical and the other a speed-regulator, or one a speed and the other a steam-pressure regulator, and that these combinations have been so made that the two regulators, together with the valve-moving mechanism, formed an integral automatically variable cut-off-valve gear.

Reference is here made to the patents to Corliss, May 27, 1879; O'Neill, January 30, 1883; and Ball, July 11, 1882. I shall not, therefore, broadly claim the use of a dynamometrical and a steam-pressure regulator in an integral variable cut-off-valve gear when each has been used with the equivalent of the other in such a connection.

My invention is based on the fact that I so combine these two regulators that while they both act independently to move the variable parts of the gear they qualify or modify the effect of each other's action, which I consider a prerequisite to the successful coaction of the two types of regulator in an engine, however applied; or, in fact, a dynamometrical with any other type of regulator, except when a centrifugal regulator is used and so adjusted that the load of the engine opposes the centrifugal force of the balls. The preferable arrangement is one that allows the dynamometrical regulator to adjust the gear without affecting the other regulator, while the other regulator qualifies the load-adjustment to suit the requirements arising from changes in the energy of the steam. The construction by which this is effected falls under the second part of my invention.

This invention has nothing to do with the manner of constructing the dynamometrical governor, nor the manner in which it operates upon the valve-gear, except in so far as it acts through the mechanism hereinafter described.

My invention is illustrated in the accompanying drawings, as follows:

Figure 1 is a side view of the engine drive-wheel, the dynamometrical and steam-pressure regulator. Fig. 2 is a view of the same devices from the front of the engine. Fig. 3 is a detail view of the collar and sliding block. Fig. 4 is a plan view of the same parts. Fig. 5 is a side elevation of my improved variable cut-off gear. Fig. 6 is a detail of the latter. Figs. 7, 8, and 9 are respectively plan, side, and end views of the gearing which connects the two regulators, modified somewhat from that which is seen in the preceding figures. Figs. 10 and 11 are respectively side and end views of a still further modification of the same gearing. Fig. 12 shows the invention applied to a Corliss valve-gear. Fig. 13 shows the gearing modified and applied to a shifting-eccentric gear. The construction here shown in this figure is the subject of a joint application by myself and a co-inventor; but it will be observed that it contains the elements of my invention, as above stated.

The dynamometrical governors here shown are fully described in other applications by myself and a co-inventor, and need not be described here, except to say that in all the figures, except 13, this governor acts by sliding a collar on the shaft, while in Fig. 13 it shifts an eccentric on the shaft. In all instances the dynamometrical governor operates upon a rocking part, which is, in some instances, a rocking arm only, while in others it is a rock-shaft or crank-shaft, and in another it is a simple bell-crank; and the steam-pressure regulator acts also upon the same part, either to move it or modify or qualify its movements from the action of the dynamometrical governor. This qualification is effected by varying in one way or another the leverage of said rocking part by the movements of the said steam-pressure regulator. In all cases, except in Fig. 14, a movement of the pressure-regulator not only varies the leverage of the rocking part, but also moves that part or the parts with which it connects.

The construction here shown is as follows, beginning with the pressure-regulator: $I^3$ is the cylinder of this regulator, and I is its piston. $I'$ is its steam-supply pipe. $I^2$ is its piston-stem. $i$ is its weighting or counteracting spring, and $i'$ the tension-regulating nut. The stem of the piston is pivoted upon the piston, and can thus have a lateral movement, which is necessary, as it connects with the rocking part of the gear. This pressure device is acted upon from the steam in the boiler or the main supply-pipe, and always registers the exact degree of boiler-pressure. The cylinder and pipe may contain water or other fluid, and be, in effect, a hydrostatic press; but it will derive its power always from the boiler-pressure of the steam. The construction of the rocking gear with which this regulator and the dynamometrical regulator connects is as follows, beginning with that shown in Figs. 1, 2, and 4: G is the pivot or shaft of the rocking part. $G'$ is the supporting-stud of said shaft. $G^2$ is an eye or slotted head on the shaft G, which receives and properly holds a sliding or variable arm, $G^3$, which connects with the stem $I^2$ of the pressure-regulator and the collar E of the dynamometrical regulator through the pin $e'$ in the block $E^2$, which slides in a slot in the face of the collar E. $G^4$ is another arm of the rocking part, which, by the rod $g$, connects with the valve-gear proper through the rocking leverage H H′ H² H³. (See Fig. 5.) The action of this gearing by the two regulators is as follows: Whenever the load of the engine changes, the collar E moves and carries the arm $G^3$ one way or the other, as the case may be, and rocks the shaft G. If the steam-pressure changes, the pressure-regulator will vary or change the length of the arm $G^3$ as follows: If the pressure is great, the arm $G^3$ will be long; if the pressure is low, the arm $G^3$ will be short. Now, if the arm $G^3$ is short, a given movement of the collar E—that is to say, a given change of load—will rock the shaft G through a longer arc than the same movement of the collar would if the arm was long. Now, this is as it should be, for if the steam-pressure was at one hundred pounds a much less variation of the cut-off of the valve will suffice for a given addition of load than would be required if the steam was only at fifty pounds. So it will be seen that the action of one regulator must qualify the action of the other; but it is also necessary that each shall act whenever it moves. As shown in the drawings, the plane of action of one regulator is substantially at right angles to the plane of action of the other, and the variable part of the rocking gear is movable in neither of these planes, but at an angle to both of them; hence neither of them can vary its position without moving the shaft G. Suppose this were not the case, and that the load-regulator held the variable arm $G^3$ in the same plane as the rod $I^2$ moves in. The result would be that changes in steam-pressure could occur without changing the valve-gear, for the arm $G^3$ would simply move in the head $G^2$, and not rock the shaft G.

The modifications of this gearing (shown in Figs. 7, 8, 9, 10, and 11) are as follows: Figs. 7, 8, 9 are plan, side, and end views, respectively, of the same construction. Here the action of the collar E upon the rocking part is through a pivoted arm, $E^4$ and rod $E^5$, and the variation of the arm $G^3$ is by a sliding block in a slot $g^3$. In Figs. 10 and 11 the construction is similar to that shown in Figs. 7, 8, and 9, only the fulcrum of the arm $E^4$ is made variable by the pressure-regulator, and the variable fulcrum moves in a diagonal slot, (not shown,) or the regulator is set at an angle to the arm E⁴, thus insuring a swinging of the lever when the fulcrum changes its position.

In Fig. 14 the rocking part is made to act upon the valve-gear by eccentrics 1 and 2, of which 1 is on the shaft G, and is contained in 2, which is moved by the pressure-regulator stem I². By this device the same variable effects are had as in the other devices.

In Fig. 13 the rocking part is a link in the valve-gear. The pressure-regulator varies the position of the eccentric-rod J in the link, and the dynamometrical regulator shifts the eccentric on the shaft, and so varies the rocking of the link.

The construction of the valve-gear proper (shown in Figs. 4 and 5) is as follows: It is in effect a link-movement, only the link is pivoted on the engine-shaft beside the eccentric. The eccentric L moves the exhaust-valve gear M M', and the link K moves the cut-off-valve rods J J'. The link K is shown in detail in Fig. 6. It has two slots, $k$ and $k'$, of which the latter is curved and receives the valve-rod J on a sliding block, $j$. The other slot is straight and holds a pin, $l$, which extends from the side of the eccentric-strap L'. The rotary movement of the eccentric gives to the link a rocking movement, and the variation of the position of the valve-rod J varies the degree of the reciprocation of said rod, and hence the cut-off of the valve. The variation of the position of the rod J is effected from the gearing H H' H² H³. The valve-rods are all carried on one rock-arm, N. The exhaust-valve rod M M' is jointed upon this arm and moves it, while the cut-off rod is guided upon it and is independent of it. The construction is as follows: The exhaust-valve rods connect with the rock-arm on pivot-pins $m$ $m$, (see Fig. 4,) and a guide-block, $m'$, is also pivoted on the inside pin, $m$, between the rod M and the arm N. The valve-rod J', which is the cut-off-valve stem, is enlarged and slotted at J³, and embraces the guide-block $m'$, and is pivoted or jointed by the joint-pin J² to the part J. The valve-rod J J' has a free sliding movement on the guide-block $m'$, and the exhaust-valve rod M M' connects and acts, as ordinarily, on the rock-arm N. This construction obviates the necessity of two rock-arms, and gives compactness and neatness of appearance.

I do not claim in this application the combination of a dynamometrical regulator on the shaft of the engine and some other type of regulator off of the shaft, said regulators being geared together to coact in the automatic regulation of the variable cut-off-valve gear of said engine; nor the combination of a variable cut-off-valve gear which is acted upon to automatically vary the cut-off by two separate regulators, one of which is mounted on the shaft of the engine, and acts dynamometrically to regulate from the changes in the load, and the other is mounted off of the shaft of the engine and is operated to regulate the speed of the engine; nor the combination of a dynamometrical regulator on the shaft of the engine, and adapted to be actuated from said dynamometrical regulator, a second regulator adjusted off of said engine-shaft, and in operative connection with said rocking part, so that both regulators shall be in coactive connection; and, finally, a cut-off valve for operating said engine which is automatically varied in its action from movements of both said regulators; nor the combination of a dynamometrical regulator which moves a sliding collar on the engine-shaft, adjusted off of said engine-shaft, and connected to be operated from said sliding collar; and, finally, means for moving the variable cut-off-valve gear of said engine from said rock-shaft; nor a dynamometrical regulator consisting of a drive-wheel loose upon the shaft, and flexibly connected with a fixed cross-arm on the shaft, which cross-arm is provided with radially-arranged rocking shaft whose outer arms are pivotally connected with the said drive-wheel, and whose inner arms act to shift a collar on the engine-shaft; nor an automatically-variable valve-gear for regulating the cut-off, which consists of a shifting eccentric on the shaft, which is operated upon by a dynamometrical regulator and a link-movement off of the shaft, which is operated by a second regulator mounted off of the shaft; nor, in a steam-engine having independent cut-off valves at each end of the cylinder, the combination, in the valve-gear for automatically varying the movement of said valves to vary the cut-off of two separate regulators acted upon by different forces, each of which coacts with the other in the performance of said office, and one of which is a dynamometrical regulator, and is mounted on the engine-shaft, as all of these form the subject-matter of separate applications, and of which I am joint inventor with John K. Hallock.

What I claim as new is—

1. In a steam-engine, the combination, substantially as shown, of two regulators operated from different forces, which are connected together by gearing which is variable from the action of one or both of said regulators, and is moved by the action of either of said regulators, and is in operative connection with the variable cut-off-valve gear of said engine in a manner substantially as shown, whereby the action of said gearing will automatically vary the cut-off-valve gear.

2. In a steam-engine, the combination, substantially as shown, of two separate regulators operated from different forces, one of which acts dynamometrically, and which are connected together by gearing which is variable from the action of one or both of said regulators, and is moved by the action of either of said regulators, and is in operative connection with the variable cut-off-valve gear of said engine, in a manner substantially as shown, whereby the action of said gearing will automatically vary the cut-off-valve gear.

3. In a steam-engine, the combination, substantially as shown, of two separate regulators operated from different forces, one of which acts dynamometrically and the other acts from the steam-pressure, and which are connected together by gearing which is variable from the action of one or both of said regulators, and is moved by the action of either of said regulators, and is in operative connection with the variable cut-off-valve gear of said engine, in a manner substantially as shown, whereby the action of said gearing will automatically vary the cut-off-valve gear.

4. In a steam-engine, the combination, substantially as shown, of a variable cut-off-valve gear which is acted upon to automatically vary the cut-off, with two separate regulators, which coact to perform said office, while each is free to act independently of the other, one of which is mounted on the driving-shaft of the engine and acts dynamometrically, and the other is mounted off of the shaft, and is operated, substantially as shown, to regulate the speed of the engine.

5. In a steam-engine, the combination, substantially as shown, of a variable cut-off-valve gear which is acted upon to automatically vary the cut-off, with two separate regulators, which coact to perform said office, while each is free to act independently of the other, one of which is mounted on the driving-shaft of the engine and acts dynamometrically, and the other is mounted off of the shaft and is operated directly from the pressure of the steam, substantially as shown, to regulate the speed of the engine.

6. In a steam-engine, the combination, substantially as shown, of a dynamometrical regulator on the shaft of the engine, gearing, substantially as shown, adjusted off of said shaft, and connected to be operated from said dynamometrical regulator, and a steam-pressure regulator mounted off of the shaft of the engine, and connected also with said gearing, in a manner substantially as shown, whereby a movement of said second regulator will not only move said gearing, but also qualify its movement from the other regulator.

7. In a steam-engine, the combination, substantially as shown, of a dynamometrical regulator which shifts a collar on the engine-shaft, a rock-shaft or crank-shaft adjusted off of said engine-shaft, and having one of its arms variable, substantially as shown, and connected by it to be operated from the said sliding collar, a second regulator mounted off of said engine-shaft, and adapted, as shown, to vary the said variable arm of said crank-shaft, and, finally, means, substantially as shown, for moving the variable cut-off-valve gear of said engine from the said rock-shaft.

8. In a steam-engine valve-gear, the combination, with the eccentric L, strap L', and pin $l$, of the link K, pivoted on the engine-shaft and operated from the pin $l$, working in the slot $k$, as shown, and for the purposes mentioned.

9. In a steam-engine valve-gear, the combination, with the rock-arm N, which is moved by the exhaust-valve rod, substantially as shown, of the pivoted guide-block $m'$, and cut-off-valve rod J J', jointed as at $J^2$, and embracing said guide-block, as at $J^3$, as shown, and for the purposes mentioned.

10. In a steam-engine valve-gear, the combination, with the cut-off-valve rod J, of the link K, pivoted on the engine-shaft and rocked from the eccentric-strap, and gearing, substantially as shown, for varying the position of said rod J in said link K from the action of the governing device of said valve-gear.

11. In a steam-engine valve-gear, the combination, with the cut-off-valve rod, of a pivoted link which is rocked by the action of the eccentric, in which link the said rod is movable for the purpose of varying the cut-off of the valve, and a gearing, substantially as shown, for varying the position of said rod in said link, which is actuated from a dynamometrical regulator on the shaft of the engine, and a second regulator, which is adjusted off of the shaft of the engine, which two regulators act upon the said gearing, in a manner substantially as shown, whereby each acts independently of the other, while one qualifies the effect of the action of the other.

In testimony whereof I affix my signature in presence of two witnesses.

ELIJAH F. SPAULDING.

Witnesses:
JNO. K. HALLOCK,
JACOB F. WALTHER.